United States Patent
Dunton et al.

(10) Patent No.: US 7,173,656 B1
(45) Date of Patent: Feb. 6, 2007

(54) METHOD AND APPARATUS FOR PROCESSING DIGITAL PIXEL OUTPUT SIGNALS

(75) Inventors: Randell R. Dunton, Phoenix, AZ (US); Sasi K. Kumar, Chandler, AZ (US); Ashutosh J. Bakhle, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 991 days.

(21) Appl. No.: 08/984,005

(22) Filed: Dec. 3, 1997

(51) Int. Cl.
- H04N 5/217 (2006.01)
- H04N 9/64 (2006.01)
- H04N 5/335 (2006.01)
- H04N 5/235 (2006.01)
- G06K 9/40 (2006.01)

(52) U.S. Cl. .............. 348/243; 348/242; 348/250; 348/222.1; 382/274

(58) Field of Classification Search ........ 348/241, 348/242, 243, 250, 248, 314, 229, 576, 607; 382/274
See application file for complete search history.

(56) References Cited

U.S. PATENT DOCUMENTS

| | | | |
|---|---|---|---|
| 4,216,503 A * | 8/1980 | Wiggins | 358/280 |
| 4,611,223 A | 9/1986 | Hine et al. | |
| 4,710,817 A * | 12/1987 | Ando | 348/241 |
| 4,740,908 A | 4/1988 | Berger et al. | |
| 5,047,861 A * | 9/1991 | Houchin et al. | 358/213.15 |
| 5,243,215 A | 9/1993 | Enomoto et al. | |
| 5,247,366 A * | 9/1993 | Ginosar et al. | 348/242 |
| 5,267,335 A * | 11/1993 | Mita | 382/62 |
| 5,278,658 A * | 1/1994 | Takase | 358/213.15 |
| 5,293,239 A * | 3/1994 | Takahashi et al. | 348/241 |

(Continued)

FOREIGN PATENT DOCUMENTS

JP 2-76481 (A) * 3/1990

(Continued)

OTHER PUBLICATIONS

Bohr, M., et al., "A High Performance 0.25 μm Logic Technology Optimized for 1.8 V Operation," IEEE, pp. 847-850. (1996).

(Continued)

Primary Examiner—Vivek Srivastava
Assistant Examiner—James M. Hannett
(74) Attorney, Agent, or Firm—Sharon Wong

(57) ABSTRACT

Briefly, in accordance with one embodiment of the invention, a digital camera includes: a digital imaging array including a plurality of pixels, and image processing circuitry to process the digital pixel output signals produced by the imaging array. The imaging processing circuitry is adapted to process saturated digital pixel output signals differently from non-saturated digital pixel output signals.

In accordance with another embodiment of the invention, at least one integrated circuit includes image processing circuitry. The processing circuitry is adapted to process digital pixel output signals produced by a digital imaging array. The image processing circuitry is further adapted to process saturated digital pixel output signals differently from non-saturated digital pixel output signals.

In accordance with yet one more embodiment of the invention, a method of processing digital pixel output signals produced by a digital imaging array includes processing saturated digital pixel output signals differently from non-saturated digital pixel output signals.

15 Claims, 3 Drawing Sheets

U.S. PATENT DOCUMENTS

| | | | | |
|---|---|---|---|---|
| 5,303,064 A | * | 4/1994 | Johnson et al. | 358/406 |
| 5,477,265 A | * | 12/1995 | Tani | 348/241 |
| 5,719,625 A | * | 2/1998 | Tani | 348/241 |
| 5,734,424 A | | 3/1998 | Sasaki | |
| 5,886,659 A | * | 3/1999 | Pain et al. | 348/292 |
| 6,618,084 B1 | * | 9/2003 | Rambaldi et al. | 348/247 |

FOREIGN PATENT DOCUMENTS

| | | |
|---|---|---|
| JP | 07-079345 A | 3/1995 |
| JP | 09-312741 A | 12/1997 |
| JP | 10-191178 | 7/1998 |

OTHER PUBLICATIONS

Costello, Majorie, "Hyberzine Expert's View," Consumer Electronics Online News at http://www.hyperzine.com/scripts/hzget.cgi?1499, Aug. 25, 1997, 3 pgs.

Hurwitz, J.E.D., et al., "An 800K-Pixel Color CMOS Sensor For Comsumer Still Cameras," SPIE vol. 3019, pp. 115-124. (1997).

Mendis, Sunetra K., et al., "Progress in CMOS Active Pixel Image Sensors," SPIE vol. 2172.

Stancampiano, Charles, "Electronic Imaging Circuits," Session 11 Overview, IEEE International Solid-State Circuits Conference, Feb. 9, 1996, pp. 177-190.

HyberZine Manufacture's View, "Canon's Optura: A Digital Camcorder That Performs Like an *SLR* Camera," Sep. 9, 1997, 4 pgs.

U.S. Appl. No. 08/873,987, for A Well to Substrate Photodiode for Use in a CMOS Sensor on a Salicide Process, filed Jun. 12, 1997, McDaniel, et al.

U.S. Appl. No. 08/885,415, for A Memory Based VLSI Architecture for Image Compression, filed Jun. 30, 1997, Tinku Acharya.

U.S. Appl. No. 08/884,923, for An Efficient Table-Lookup Based Visually-Lossless Image Compression Scheme, Jun. 30, 1997, Tinku Acharya.

U.S. Appl. No. 08/940,457, for Active-Pixel Sensor Cell Having A Dark-Current Canceling Differential Architecture, filed Sep. 30, 1997, Clark. et al.

U.S. Appl. No. 08/940,458, for A Companding Algorithm to Transform an Image to a Lower Bit Resolution, filed Sep. 30, 1997, Tinku Acharya.

U.S Appl. No. 08/963,097, for Dual Mode Digital Camera for Video and Still Operation, filed Nov. 3, 1997, Dunton, et al.

U.S Appl. No. 08/963,334, for A Block-Matching Algorithm for Color Interpolation, filed Nov. 3, 1997, Tinku Acharya.

Hon-Sum Philip Wong, et al., "CMOS Active Pixel Image Sensors Fabricated Using a 1.8-V, 0.25-μm CMOS Technology", IEEE Transactions on Electron Devices, vol. 45, No. 4, Apr. 1998 (pp. 889-894).

Examination Report under Section 18(3), dated Aug. 20, 2001, UK Application No. GB 0013353.8 (related matter P5319UK), Applicant, Intel Corporation (5 pages).

\* cited by examiner

METHOD AND APPARATUS FOR PROCESSING DIGITAL PIXEL OUTPUT SIGNALS

BACKGROUND

1. Field of the Invention

The invention relates to processing pixel output signals and, more particularly, to processing digital pixel output signals.

2. Background Information

With advances in digital technology, digital cameras, that is, cameras that represent the intensity of light for a given pixel location of an image in a binary digital signal format, such as with bits, are becoming more prevalent. One disadvantage of the use of such cameras, however, is the noise or offset that is sometimes encountered with the use of digital imaging arrays, such as arrays that employ charged couple device sensors or complementary-metal-oxide semiconductor sensors, hereinafter referred to as CCD sensors and CMOS sensors, respectively.

In order to address this so-called fixed pattern noise (FPN), one technique that has been employed is to read a "dark image" into memory, such as by preventing the sensors of the array from being exposed to light at a set of substantially predetermined parameters including, for example, exposure, temperature and gain factor, and storing the resulting digital pixel output signals. Then, that stored dark image is subtracted from the image of interest produced using the digital imaging array. Typically, in either hardware or software, the digital camera would ensure that corresponding pixel output signals for the desired image and the dark image are associated so that they may be appropriately subtracted or compared. However, the presence of this noise and the approach employed to address it introduces additional complexities into the processing of an image that are not present for cameras that store a signal value for the intensity of a pixel in a format other than a binary digital signal format. A need therefore exists for techniques to address the complexities that digital cameras employing these sensors present.

SUMMARY

Briefly, in accordance with one embodiment of the invention, a digital camera includes: a digital imaging array including a plurality of pixels, and image processing circuitry to process the digital pixel output signals produced by the imaging array. The imaging processing circuitry is adapted to process saturated digital pixel output signals differently from non-saturated digital pixel output signals.

In accordance with another embodiment of the invention, at least one integrated circuit includes image processing circuitry. The image processing circuitry is adapted to process digital pixel output signals produced by a digital imaging array. The image processing circuitry is further adapted to process saturated digital pixel output signals differently from non-saturated digital pixel output signals.

In accordance with yet one more embodiment of the invention, a method of processing digital pixel output signals produced by a digital imaging array includes processing saturated digital pixel output signals differently from non-saturated digital pixel output signals.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

Figure 1:
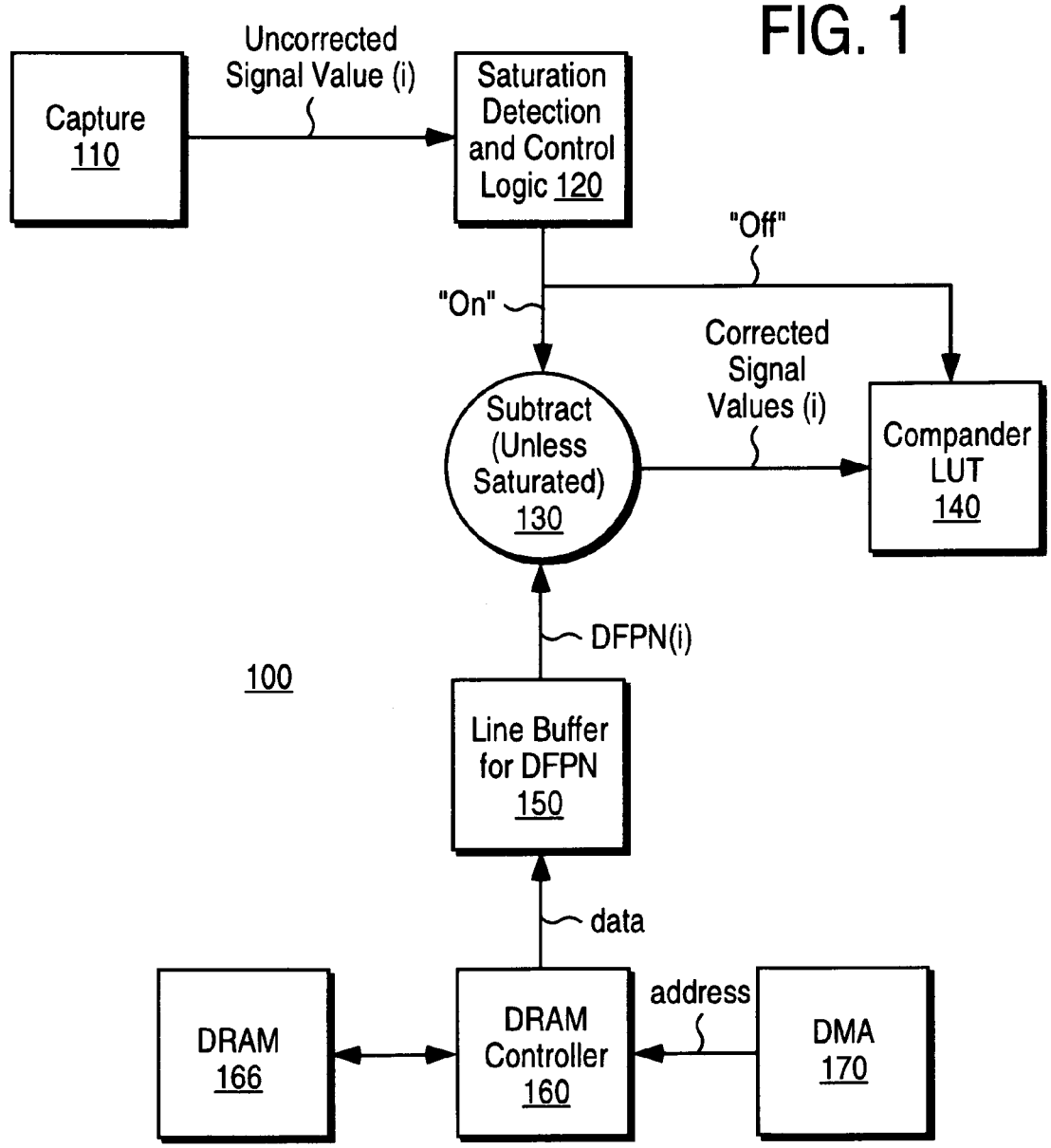
FIG. 1 is a block diagram illustrating the logical operation of an embodiment of an apparatus for processing digital pixel output signals in accordance with the invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in details so as not to obscure the present invention.

As previously described, digital cameras are becoming more common due, at least in part, to improvements in digital technology. Therefore, imaging arrays comprising CCD and CMOS sensors are being deployed. One aspect, however, associated with the use of such sensors, is the presence of fixed pattern noise (FPN). In order to improve the quality of the resulting image produced using imaging arrays comprising such sensors, one technique is to acquire a dark image, store it in memory, such as random access memory (RAM) or dynamic RAM (DRAM), use the imaging array to acquire an image of interest, and then subtract or remove the stored dark image from the image of interest. Therefore, the FPN is collected by restricting the sensors from being exposed to light, preferably as close as possible to a set of parameters, such as the exposure, temperature and gain factor, employed to produce the image of interest, and storing the resulting digital pixel output signals. In general, it is desirable to acquire the dark image under conditions that mimic the conditions for the image of interest as closely as possible. Likewise, a digital camera including an image processing will also include digital camera or imaging array circuitry adapted to process digital pixel output signals produced by the imaging array. Therefore, the circuitry will synchronize the corresponding digital pixel output signals produced for the image of interest and for the dark image so that they may be subtracted from each other or compared. It will, of course, be appreciated by one of ordinary skill in the art that this processing may be implemented purely in hardware or alternatively in software executing on a hardware platform, such as including a processor, such as a microprocessor or digital signal processor, for example. In this context, the term circuitry is intended to refer to and include any hardware, whether special purpose hardware, general purpose hardware with special purpose software, "firmware", or any combination thereof.

As previously described, one problem with this approach or technique is that it introduces additional complexity in comparison with approaches that do not employ binary digital signals or bits. For example, when employing binary digital signals of a fixed length, the dynamic range for the intensity of light received by a pixel of the imaging array is inherently limited. Therefore, when a pixel is exposed to an intensity of light that exceeds that dynamic range, the image quality is affected because the digital pixel output signal becomes saturated or clipped and, therefore, the output signal of the pixel is not an accurate representation of the intensity of the light to which the pixel was exposed. A typical situation in which this might occur, for example, is referred to as "specular reflection". In this context, specular reflection refers to light directly reflected into the sensor from a very intense or bright source, such as the sun, for example. As a result, the dynamic range of the intensity for all the image features is usually well beyond the capability of a digital sensor, leading to signal clipping. Therefore, in a situation where a subset of the pixels of the imaging array are saturated or produce clipped pixel output signals, the technique previously described of subtracting the dark image may introduce additional noise into the image rather than reducing the presence of noise, as is the desired result.

Although both CCD and CMOS sensors produce FPN, with state of the art technology CMOS sensors typically exhibit a greater amount. The source of FPN may come from a variety of factors, however, typically includes minute defects in the fabrication process of the CMOS sensor. Other factors that may produce such noise include the imaging array circuit design or the geometry of the array.

Figure 3:
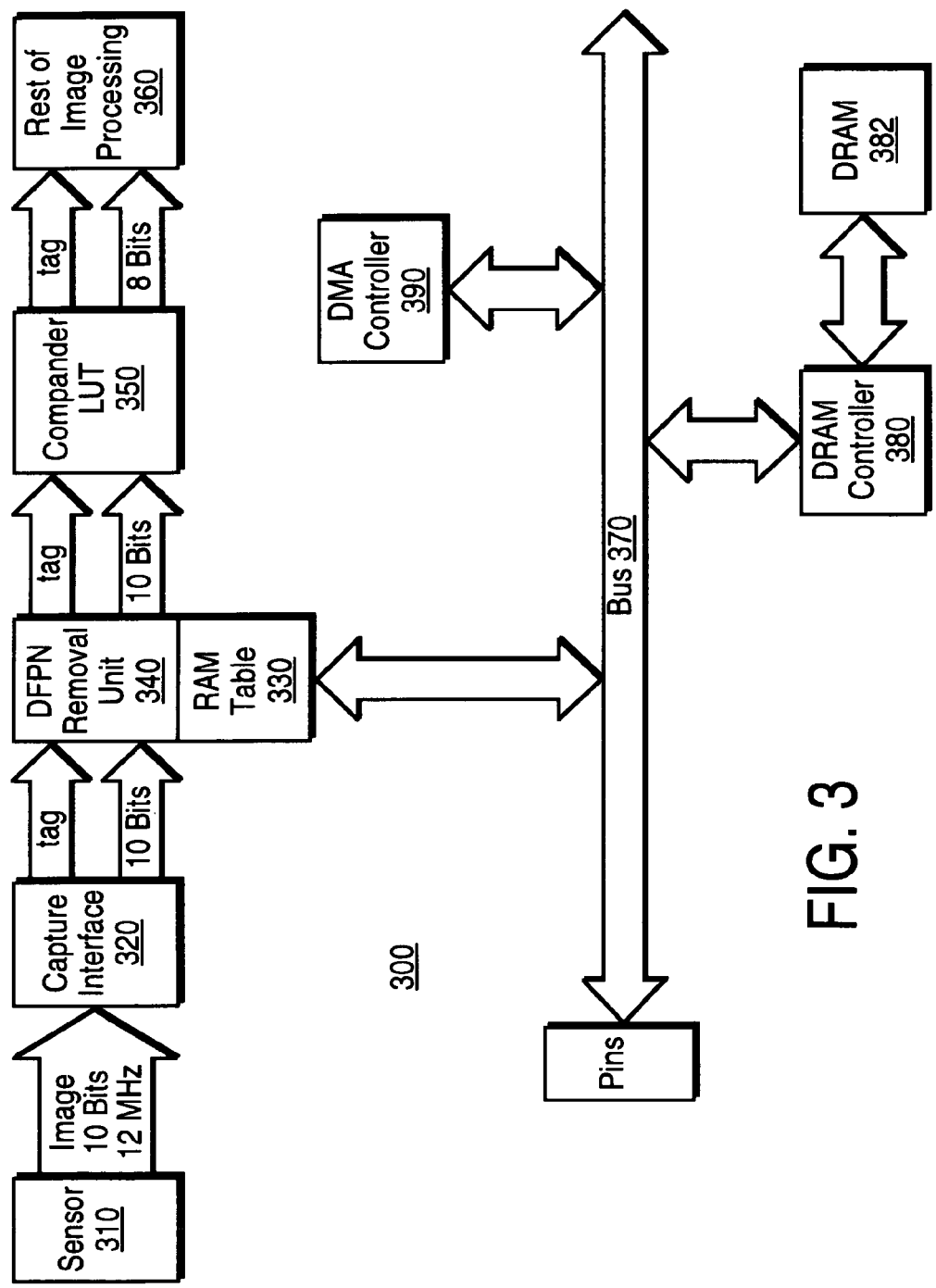
FIG. 3 is a block diagram illustrating a hardware embodiment of an apparatus for processing digital pixel output signals in accordance with the present invention.

An embodiment of a digital camera in accordance with the present invention, such as illustrated by embodiment 300 in FIG. 3, includes a digital imaging array 310 comprising a plurality of pixels made up of sensors, such as CCD and CMOS sensors, for example. In addition, digital camera 300 includes image processing circuitry to process the digital pixel output signals produced by the pixels of the imaging array. For example, as illustrated in FIG. 3, in this embodiment, the digital pixel output signals each comprising 10 bits are provided at 12 MHz to capture interface circuitry 320, although the invention is not limited in scope in this respect. This raw image data in the form of binary digital signals is then provided to a dark fixed pattern noise (DFPN) reduction or removal unit 340. In removal unit 340, the digital pixel output signals for the desired image are compared with the digital pixel output signals for the dark image. The digital pixel output signals for the dark image are produced using imaging array 310, as previously described, and those digital pixel output signals are stored, in this particular embodiment, by a RAM table 330 using a data flow controller, such as a direct memory addressing (DMA) controller 390, and DRAM controller 380. Of course, the invention is not limited in scope to this memory architecture. When the dark image is produced and stored, the aspect of the removal unit that performs the subtraction is bypassed. Therefore, when the desired image is produced, the dark image is retrieved from memory 330 and the resulting binary digital signals produced by subtracting the dark image from the desired image are then provided to compander look-up table (LUT) 350. As illustrated in FIG. 3, the binary digital signals are provided to compander LUT 350 as 10 bits and are then provided from the compander as 8 bits for the remaining image processing. In addition, FIG. 3 illustrates that in this embodiment a color tag is also provided. In this particular embodiment, although the invention is not limited in scope in this respect, the color tag provided designates a color plane for a digital pixel output signal. Any one of a number of possible color spaces may be employed; however, one such color space is the Red-Green-Blue (RGB) color space.

Therefore, three images representing different colors are produced and processed rather than a single image and, in this embodiment, a color tag is provided with each image. In this embodiment using compander LUTs, three compander LUTs, one corresponding to each color, are employed. If will, of course, be appreciated that the invention is not limited to producing color images or to the RGB color space.

One aspect of this embodiment of the digital camera in accordance with the present invention is that the imaging array circuitry is adapted to process saturated digital pixel output signals differently from non-saturated digital pixel output signals. This aspect of this particular embodiment is illustrated in greater detail in FIG. 1, although, again, the invention is not limited in scope to this particular embodiment. As illustrated in FIG. 1, the image is first captured or acquired, as illustrated by block 110. The uncorrected digital pixel output signals are then provided to saturation detect and control logic 120. If a particular digital pixel output signal is not saturated, the captured uncorrected signal value is provided to node 130 so that the corresponding signal value of the dark image may be subtracted. However, this subtraction does not occur if the saturation detect and control logic indicates that the particular digital pixel output signal of the desired image is saturated. In this embodiment, this saturation detect and control logic is included in dark fixed pattern noise removal unit 340. As previously described, the dark image is acquired and stored prior to producing and storing the desired image. Therefore, as illustrated in FIG. 1, DRAM controller 160 and DMA 170, respectively, provide the stored digital pixel output signals and the corresponding address in this particular embodiment. Of course, the invention is not limited in scope in this respect. Therefore, in this embodiment, line buffer 150 then provides the corresponding digital pixel output signals of the dark image to be processed with the uncorrected digital pixel output signals of the desired image that was captured as indicated by block 110. Once the subtraction has occurred, the corrected digital pixel output signals are then provided to compander LUT 140, as illustrated in FIG. 1.

In this particular embodiment, although the invention is not restricted in scope in this respect, as previously described, 10 binary digital signals or bits are used to represent an intensity level. Therefore, a digital pixel output signal is clipped or saturated when 10 ones or a hexadecimal signal value "3FF" is detected. Therefore, in one particular embodiment of a digital camera or digital camera circuitry in accordance with the present invention, when the signal value "3FF" is detected as the digital pixel output signal for a particular pixel of the desired image, instead of subtracting the corresponding digital pixel output signal of the dark image for that pixel, the subtraction is bypassed or turned "off,"0 as indicated, for example, in FIG. 1. The saturated signal value is provided to compander LUT 140 in FIG. 1 or 350 in FIG. 3.

Figure 2:
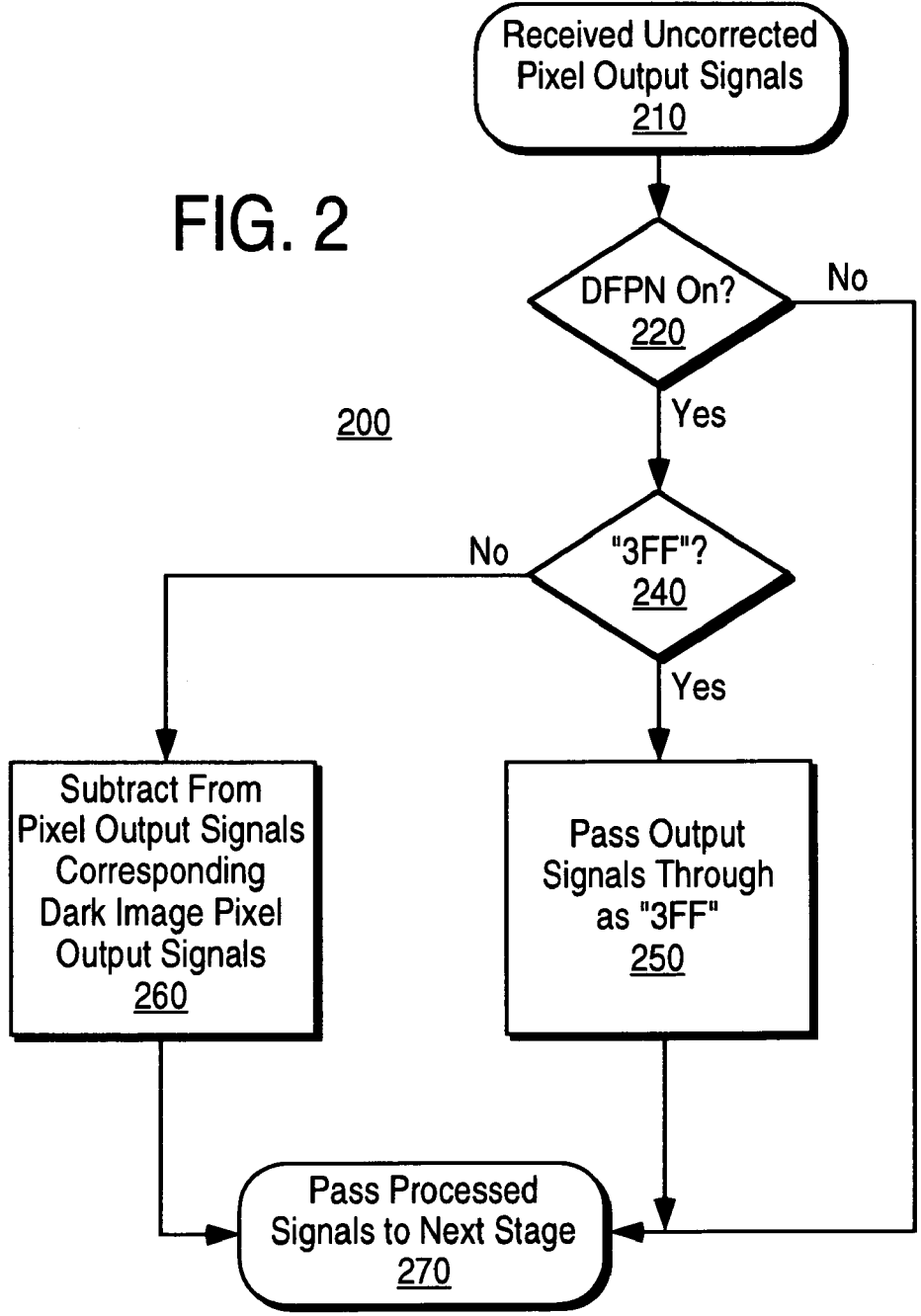
FIG. 2 is a flow chart illustrating an embodiment of a method for processing digital pixel output signals in accordance with the invention.

This embodiment is also illustrated by the flow chart of FIG. 2. In this embodiment, an uncorrected digital pixel output signal is received by the removal unit at block 210. At block 220, a decision is made regarding whether the dark fixed pattern noise reduction or removal feature is "turned on." This feature would not be turned on, for example, where the dark image is being acquired and stored. In this case, as illustrated in FIG. 2 at block 270, these processed binary digital signals are passed to the next stage, which in this particular embodiment results in applying these signals to the compander. However, if this feature is "turned on," and a saturation special case has been encountered, the circuitry detects whether the signal value equals "3FF" in this particular embodiment, as illustrated by block 240. If not, then the corresponding signal value from the dark image is subtracted as indicated by block 260. However, if this binary digital signal value is detected, i.e., "3FF" in this embodiment, then instead of performing the subtraction, this particular binary digital signal value is passed through as the binary digital signal value "3FF," as indicated by block 250.

In yet another embodiment of a digital camera in accordance with the present invention, the saturated digital pixel output signals are processed differently from the non-saturated pixel digital output signals; however, this different processing includes more than bypassing the subtraction of the corresponding digital pixel output signals of the dark image. For example, in one embodiment, an average dark fixed pattern noise level may be subtracted from all the saturated binary digital signal values. This approach provides several advantages. Due to the nature of the fixed pattern noise, typically the dark image signal values that would be subtracted in the absence of an embodiment for the present invention would be non-uniform and, therefore, would provide an uneven or patchy appearance to the image if subtracted from saturated signal values. More specifically, the human eye would expect the image in this region to be uniform or clipped and by subtracting the dark image signal values, noise would thereby be introduced. Therefore, it is desirable to subtract an average value rather subtract the particular signal values of the dark image from the corresponding saturated signal values. Furthermore, where saturated signal values are encountered, the relative intensity of those saturated values in comparison with the non-saturated values would be greater than desired if the dark image signal values were subtracted from only the non-saturated signal values. This may undesirably affect the appearance of the image to an observer. Therefore, it would also be desirable if a value could be subtracted from the saturated signal values to reduce this relative intensity. This subtraction reduces or avoids a waste of the dynamic range available that comes from a high relative intensity.

Any one of a number of techniques to obtain the average signal value to be subtracted from the saturated signal values may be employed. In this particular embodiment, the signal values of the dark image are sampled to produce a mean and standard deviation and thereby approximate the level of the fixed pattern noise. Of course, a variety of different sampling techniques may be employed in different embodiments. For example, it may be desirable to sample only in the saturated regions of the desired image. Alternatively, it may be desirable to examine the standard deviation and, depending upon the value of the standard deviation, subsample regions of the image in order to reduce the standard deviation. Likewise, trends in the noise may be observed by processing selected portions of the dark image, such as where, for example, the mean and/or deviation may be larger in one portion of the image than in another.

Likewise, in another embodiment of the invention, subtracting the value determined as the average dark fixed pattern level signal value may be incorporated in the processing implemented by the compander look-up table so that this subtraction operation may be combined with other operations, such as a compander operation and an operation to adjust for the differences between color response of the sensor and the human eye, referred to as a gamma operation. More specifically, in one embodiment, although the invention is not limited in scope in this respect, in the compander operation, ten bits are received and from this eight bits are produced. This is a substantially non-linear operation implemented using a look-up table. A reason this particular operation is substantially non-linear is because this operation is intended to reflect or correspond to the response of the human eye to light. Therefore, in this particular embodiment, the values for the LUT are arrived at by beginning with an analytical model of this response and then adjusting it empirically. Likewise, a gamma operation is also employed to adjust the color response of the resulting image. More specifically, in this particular embodiment, a color filter array (CFA) is included inherently in the imaging array sensors, although this may be accomplished many ways and the invention is not restricted in scope in this respect or even to employing a CFA. Therefore, a gamma operation is employed in order to invert or remove the effect this color filter array has had on arriving at calibrating color in the resulting image. Also, in this particular embodiment, as previously described, the signal value determined to be or represent the level of the dark image pattern fixed noise may likewise be subtracted. Furthermore, in this embodiment, because the value of a clipped or saturated digital pixel output signal value is known, subtraction may be implemented by merely storing the signal value to be subtracted. Of course, the invention is not restricted in scope in this respect. As is well-known, the three operations previously described may be combined and implemented using a single look-up table. Although the precise steps to accomplish this are not discussed here, such techniques are clearly within the level of skill of one of ordinary skill in the art to which this invention pertains. Again, as previously described, different look-up tables are employed for each color plane in this embodiment, although the invention is not limited in scope in this respect.

In yet another embodiment of a digital camera in accordance with the present invention, imaging processing circuitry may include the capability to identify saturation regions of the image before processing the saturated digital pixel output signals differently than the non-saturated digital pixel output signals. More particularly, in one embodiment, for example, the removal unit may be adapted to check the output signals of bordering pixels for a pixel producing a saturated output signal to verify that all the immediately adjacent pixel output signals are also saturated. In one embodiment, if not all are saturated, then this saturated signal value may not be processed differently. Alternatively, if a particular number of signal values in the surrounding region are detected to be saturated, then the output signals for pixels that are in that region and saturated may be processed differently. Other embodiments to determine and/or designate a region of saturated digital pixel output signal values may be employed. Likewise, where a saturated digital output signal value is identified, the image processing circuitry may include the capability to determine that it is not in a region of saturated signal values. For example, where the saturated signal value is an isolated saturated signal value, no different processing in comparison with non-saturated pixel output signals might be employed. Again, alternative approaches may be employed.

Of course, as previously indicated, embodiments may be implemented a variety of ways. For example, as previously described, the processing may be "hardwired." Alternatively, as previously described, a processor, such as a DSP or microprocessor, may be loaded with software that, when executing on the processor, performs the desired operations. Alternatively, an embodiment may be implemented in firmware as well. Although the invention is not limited in scope in this respect, it is typically more desirable to implement embodiments in ways that result in higher speed processing due to the relatively high number of binary digital signal values or bits to be processed.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. At least one integrated circuit comprising:
   image processing circuitry;
   said image processing circuitry being adapted to process digital pixel output signals produced by a digital imaging array including imaging array sensors; and
   said image processing circuitry being adapted to process saturated digital pixel output signals differently from non-saturated digital pixel output signals including sampling a dark image in regions corresponding to regions of saturated digital pixel output signals, wherein said image processing circuitry processes saturated digital pixel output signals by subtracting an estimate of a dark image fixed pattern noise for said imaging array sensors and estimates dark fixed pattern noise by sampling from the dark image comprising stored digital pixel output signals.

2. The at least one integrated circuit of claim 1, wherein said image processing circuitry is adapted for use with imaging array sensors comprising at least one of a CCD sensor and a CMOS sensor.

3. The at least one integrated circuit of claim 1, wherein the image processing circuitry comprises dark fixed pattern noise reduction circuitry.

4. The at least one integrated circuit of claim 3, wherein the fixed pattern noise reduction circuitry comprises dark fixed pattern noise reduction circuitry.

5. The at least one integrated circuit of claim 1, wherein said image processing circuitry is adapted to detect regions of saturated digital pixel output signals in an image of interest.

6. A digital camera comprising:
   a digital imaging array comprising a plurality of pixels, and imaging processing circuitry to process the digital pixel output signals produced by said imaging array; and
   said imaging processing circuitry being adapted to process saturated digital pixel output signals differently from non-saturated digital pixel output signals, including sampling a dark image in regions corresponding to regions of saturated digital pixel output signals in an image of interest, wherein said imaging processing circuitry estimates dark fixed pattern noise by sampling from the dark image comprising stored digital pixel output signals and processes saturated digital pixel output signals by subtracting an estimate of a dark image fixed pattern nose for said imaging array sensors.

7. The digital camera of claim 6, wherein said image processing circuitry is adapted for use with imaging array sensors comprising at least one of a CCD sensor and CMOS sensor.

8. The digital camera of claim 6, wherein the image processing circuitry comprises fixed pattern noise reduction circuitry.

9. The digital camera of claim 8, wherein the fixed pattern noise reduction circuitry comprises dark fixed pattern noise reduction circuitry.

10. The digital camera of claim 6, wherein said image processing circuitry is adapted to detect regions of saturated digital pixel output signals in an image of interest.

11. A method of processing digital pixel output signals produced by a digital imaging array including imaging array sensors comprising:
    processing saturated digital pixel outputs differently from non-saturated digital pixel output signals including sampling a dark image in regions corresponding to the regions of saturated digital pixel output signals; and
    estimating a dark image fixed pattern noise for said imaging array sensors including sampling from the dark image comprising stored digital pixel output signals, wherein processing saturated digital pixel output signals differently includes subtracting an estimate of the dark image fixed pattern noise for said imaging array sensors.

12. The method of claim 11, wherein said imaging array sensors comprise at least one of a CD sensor and a CMOS sensor.

13. The method of claim 11, wherein processing saturated digital pixel output signals comprises fixed pattern noise reduction processing.

14. The method of claim 13, wherein fixed pattern noise reduction processing comprises dark fixed pattern noise reduction processing.

15. The method of claim 11, wherein processing saturated digital pixel output signals includes detecting regions of saturated digital pixel output signals in an image of interest.

* * * * *